United States Patent [19] [11] Patent Number: 4,668,412
Hart et al. [45] Date of Patent: May 26, 1987

[54] LUBRICATING OIL CONTAINING DISPERSANT VII AND POUR DEPRESSANT

[75] Inventors: William P. Hart, Beacon; Christopher S. Liu, Poughkeepsie, both of N.Y.

[73] Assignee: Texaco Inc., White Plains, N.Y.

[21] Appl. No.: 749,336

[22] Filed: Jun. 27, 1985

[51] Int. Cl.[4] ............................................. C10M 149/06
[52] U.S. Cl. ................................ 252/51.5 A; 524/544; 525/327.6; 525/380
[58] Field of Search ...................... 525/327.6; 524/549; 254/51.5 A

[56] References Cited

U.S. PATENT DOCUMENTS

| 2,947,733 | 8/1960 | Werner et al. | 525/327.6 |
|---|---|---|---|
| 3,184,309 | 5/1965 | Minsk et al. | 525/327.6 |
| 3,427,219 | 2/1969 | Bonzagni | 525/327.6 |
| 3,557,066 | 1/1971 | Cohen et al. | 525/327.6 |
| 3,729,452 | 4/1973 | Andress, Jr. et al. | 525/327.6 |
| 3,762,863 | 10/1973 | Charle et al. | 525/327.6 |
| 3,763,086 | 10/1973 | Kalopississ et al. | 525/327.6 |
| 3,933,761 | 1/1976 | Coleman | 525/327.6 |
| 4,065,607 | 12/1977 | Kurowsky | 525/327.6 |
| 4,083,835 | 4/1978 | Pohlemann et al. | 525/327.6 |
| 4,157,431 | 6/1979 | Fields et al. | 525/327.6 |

Primary Examiner—Joseph L. Schofer
Assistant Examiner—Bernard Lipman
Attorney, Agent, or Firm—Robert A. Kulason; James J. O'Loughlin; Carl G. Seutter

[57] ABSTRACT

Lubricating oils of improved properties contain a terpolymer of maleic acid anhydride and lauryl methacrylate and stearyl methacrylate which has been functionalized with dimethylaminopropylamine and a Mannich base of N-aminoethylpiperazine, paraformaldehyde, and 2,6-di-t-butyl phenol.

37 Claims, No Drawings

LUBRICATING OIL CONTAINING DISPERSANT VII AND POUR DEPRESSANT

FIELD OF THE INVENTION

This invention relates to lubricating oils. More particularly it relates to lubricating oils containing additives which impart improved properties.

BACKGROUND OF THE INVENTION

As is well known to those skilled in the art, lubricating oils are characterized by a variety of properties including viscosity, viscosity index, pour point, dispersancy, etc; and as improvements are made in the design of engines, there is a constant struggle to improve the properties of lubricating oils in order to meet the ever-increasing standards.

It is an object of this invention to provide a novel lubricating oil system. Other objects will be apparent to those skilled in the art.

STATEMENT OF THE INVENTION

In accordance with certain of its aspects, this invention is directed to a functionalized polymer comprising (a) first units, derived from first monomer containing an ethylenically unsaturated carbon-to-carbon double bond; and (b) second units, derived from a different second monomer, a dicarboxylic acid anhydride containing an ethylenically unsaturated carbon-to-carbon double bond;

(c) said polymer bearing functionalizing groups derived from:

(i) a primary or secondary functionalizing amine; and (ii) a functionalizing Mannich base formed by reacting a phenol containing an active hydrogen atom, an aldehyde, and a primary or secondary polyamine.

In accordance with certain of its more preferred aspects, this invention is directed to a functionalized copolymer comprising (i) acrylic ester units, derived from first monomer, having the formula $$\begin{array}{c} R^1 \\ | \\ C=CH_2 \\ | \\ COOR^2 \end{array}$$

wherein $R^2$ is a hydrocarbon group selected from the group consisting of alkyl, aralkyl, alkaryl, cycloalkyl, and aryl hydrocarbon groups and $R^1$ is hydrogen or selected from the same group as $R^2$; and (ii) dicarboxylic units, derived from second monomer, having the formula $$\left[ \begin{array}{c} O \\ \| \\ R^3-C-C- \\ | \\ R^4-C-C- \\ \| \\ O \end{array} \right] [X]_r [Y]_s$$

wherein $R^3$ and $R^4$ are hydrogen or selected from the same group as $R^2$;

X is derived from a primary amine

Y is derived from Mannich base, both X and Y being bonded to the dicarboxylic units through a nitrogen atom; and r and s may be 0, 1, or 2, at least one of r or s being at least 1, and r+s being 1 or 2.

DESCRIPTION OF THE INVENTION

The charge polymer which may be employed in practice of the process of this invention may include an oil-soluble, substantially linear, carbon-carbon backbone polymer. Typical carbon-carbon backbone polymers prepared from monomers bearing ethylenically unsaturated polymerizable double bond which may be employed include homopolymers or copolymer prepared from monomer $$\begin{array}{c} C=C \\ | \quad | \\ E \quad A \end{array}$$

wherein A may be: hydrogen; hydrocarbon such as alkyl, aryl, etc.; phenyl, acetate or acyloxy (typified by —COOR); halide; etc. E is typically hydrogen.

Illustrative of such monomers may be acrylates, methacrylates, vinyl halides (such as vinyl chloride), styrene, olefins such as propylene, butylene, etc., vinyl acetate; dienes such as butadiene, isoprene, hexadiene, ethylidene norbornene, etc. Hompolymers of olefins (such as polypropylene, polybutylene, etc.), dienes (such as hydrogenated polyisoprene), or copolymers of ethylene with e.g. propylene, butylene and higher olefins, styrene with isoprene and/or butadiene may be employed. The carbon-carbon backbone polymers includes those selected from the group consisting of ethylenepropylene copolymers (EPM or EPR) and ethylene-propylene-diene third monomer terpolymers (EPDM or EPT). Although it may be possible to utilize EPM or EPDM copolymer, or copolymers of ethylene-vinyl acetate etc for example, it is preferred to utilize copolymers of a maleic acid anhydrite and an acrylate- or methacrylate-type ester.

The preferred polymer composition of this invention may be prepared from an ester first monomer having the formula $$\begin{array}{c} R^1 \\ | \\ CH_2=C-COOR^2 \end{array}$$

In the above formula, $R^2$ may be a hydrocarbon group selected from the group consisting of alkyl, aralkyl, cycloalkyl, aryl, and alkaryl, including such radicals when inertly substituted. When $R^2$ is alkyl, it may typically be methyl, ethyl, n-propyl, iso-propyl, n-butyl, i-butyl, sec-butyl, amyl, octyl, decyl, octadecyl, etc. When $R^2$ is aralkyl, it may typically be benzyl, beta-phenylethyl, etc. When $R^2$ is cycloalkyl, it may typically be cyclohexyl, cycloheptyl, cyclooctyl, 2-methylcycloheptyl, 3-butylcyclohexyl, 3-methylcyclohexyl, etc. When $R^2$ is aryl, it may typically be phenyl, naphthyl, etc. When $R^2$ is alkaryl, it may typically be tolyl, xylyl, etc. $R^2$ may be inertly substituted. Inertly substituted $R^2$ groups may include 2-ethoxyethyl, carboethoxymethyl, 4-methylcyclohexyl, etc. The preferred $R^2$ groups may be alkyl, more preferably $C_1$-$C_{30}$ alkyl, groups including eg methyl, ethyl, n-propyl, i-propyl, butyls, amyls, hexyls, octyls, decyls, etc. $R^2$ may preferably be lauryl ($C_{12}$).

$R^1$ may be hydrogen or selected from the group from which $R^2$ is selected. $R^1$ is preferably hydrogen or methyl.

Typical ester first monomers which may preferably be employed in practice of the process of this invention may include the following:

| TABLE | |
|---|---|
| lauryl | acrylate |
| lauryl | methacrylate |
| lauryl | ethacrylate |
| myristyl | acrylate |
| myristyl | methacrylate |
| cetyl | acrylate |
| cetyl | methacrylate |
| stearyl | acrylate |
| stearyl | methacrylate |
| methyl | acrylate |
| ethyl | methacrylate |
| methyl | methacrylate, etc. |

Preferred as a first monomer is lauryl methacrylate.

It is a feature of this invention that it is possible to use a supplemental ester first monomer which is selected from the same group as the first monomer is selected. Preferably the supplemental ester first monomer may have (in the $R^2$ portion of the molecule derived from the alcohol) at least one more (and preferably at least two more) carbon atoms than are possessed by the $R^2$ group of the ester first monomer. The ester first monomer is preferably characterized by the presence of 10–16 carbon atoms in the alcohol-derived moiety and the supplemental ester first monomer is preferably characterized by 12–18 carbon atom in the alcohol-derived moiety.

It is possible in practice of the process of this invention to utilize pure monomers or commercially available monomers which contain several monomer species.

In one preferred embodiment, the first monomer may be lauryl ($C_{12}$) methacrylate and the supplemental first monomer may be stearyl ($C_{18}$) methacrylate.

The second monomer, which is different from the first monomer, may be characterized as a dicarboxylic monomer preferably derived from a maleic anhydride nucleus, and it may be characterized by the formula

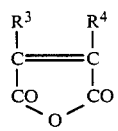

In the above formula, $R^3$ or $R^4$ may be hydrogen or a hydrocarbon group selected from the group consisting of alkyl, aralkyl, cycloalkyl, aryl, and alkaryl, including such radicals when inertly substituted. When $R^3$ or $R^4$ is alkyl, it may typically be methyl, ethyl, n-propyl, iso-propyl, n-butyl, i-butyl, sec-butyl, amyl, octyl, decyl, octadecyl, etc. When $R^3$ or $R^4$ is aralkyl, it may typically be benzyl, beta-phenylethyl, etc. When $R^3$ or $R^4$ is cycloalkyl, it may typically be cyclohexyl, cycloheptyl, cyclooctyl, 2-methylcycloheptyl, 3-butylcyclohexyl, 3-methylcyclohexyl, etc. When $R^3$ or $R^4$ is alkaryl, it may typically be tolyl, xylyl, etc. $R^3$ or $R^4$ may be inertly substituted i.e. it may bear a non-reactive substituent such as alkyl, aryl, cycloalkyl, ether, etc. Typically inertly substituted $R^3$ or $R^4$ groups may include 2-ethoxyethyl, carboethoxymethyl, 4-methylcyclohexyl, etc. The preferred $R^3$ or $R^4$ groups may be hydrogen or lower alkyl, i.e. $C_1$–$C_{10}$ alkyl, groups including eg methyl, ethyl, n-propyl, i-propyl, butyls, amyls, hexyls, octyls, decyls, etc. $R^3$ or $R^4$ may preferably be hydrogen.

Second monomers which may be employed may include the following:

| TABLE |
|---|
| maleic acid anhydride |
| methyl maleic acid anhydride |
| phenyl maleic acid anhydride |
| ethyl maleic acid anhydride |
| dimethyl maleic acid anhydride |

The preferred second monomer may be maleic acid anhydride.

Copolymerization of the first monomer, the optional supplemental first monomer, and the second monomer may be effected by adding to the reaction mixture, the following molar proportions:

| TABLE | | | |
|---|---|---|---|
| Component | Broad | Preferred | Typical |
| First Monomer | 50–80 | 70–80 | 80 |
| Supplemental First Monomer | 0–15 | 9–15 | 14.5 |
| Second Monomer | 5–40 | 5–10 | 5.5 |

Polymerization may be carried out in the presence of 5–20 parts, say 9 parts of inert polymerization solvent (per 100 parts of total reactants) typified by hydrocarbons such as lubricating oils (preferably the lubricating oil in which the polymer is to be incorporated), standard API oils typified by the well-known 145 P Pale Turbine Stock, or other common polymerization solvents. Hydrocarbon solvents including typically $C_6$–$C_{20}$ liquids may be useful polymerization solvents. There may also be present 20–70, say 40 parts of diluent oil, such as SNO-7 oil or 100 E Pale Oil—to achieve the final composition.

Preferably polymerization is effected under inert atmosphere, typically nitrogen, preferably at atmospheric pressure and in the presence of 0.01–0.2 w%, say 0.08 w%, of a free-radical initiator such as azobisisobutyronitrile, benzoyl peroxide, etc. Also present may be 0.1–1.0 w%, preferably 0.05–0.5, say 0.25 w% of chain transfer agent typically lauryl mercaptan. Polymerization occurs at 40° C.–150° C., preferably 40° C.–100° C., say about 80° C. over 1–6 hours, say 3.5 hours.

Reaction is monitored by refractive index; and it may be considered complete when two consecutive refractive indices are identical—typically about 3.5 hours. Then additional initiator, 0.005–0.02 parts, say 0.01 parts, may be added together with 20–70 parts, say 40 parts of additional diluent. The reaction mixture may then be heated to 60° C.–160° C., say 100° C. at atmospheric pressure for 0.5–2 hours, say 1 hour followed by cooling to room temperature.

The following reaction may occur:

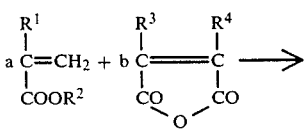

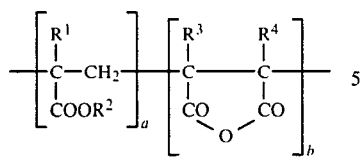

wherein a is 410–670, say 656 amd b is 20–280, say 35.

More particularly, when supplemental first monomer is present, the reaction may be:

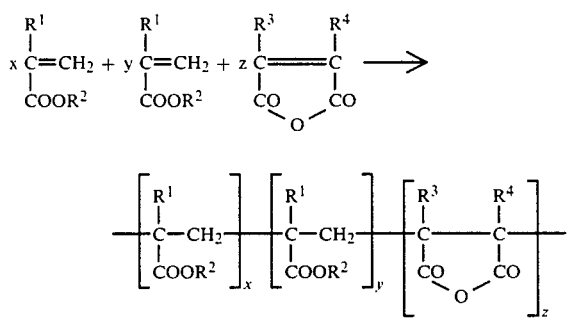

wherein x (representing the number of moles derived from first monomer) may be 340–560, say 552 and y (representing the number of moles derived from supplemental first monomer) may be 70–110, say 104 and z (representing the number of moles derived from second monomer) may be 20–280, say 35.

In the case of one preferred embodiment, the reaction may be as follows:

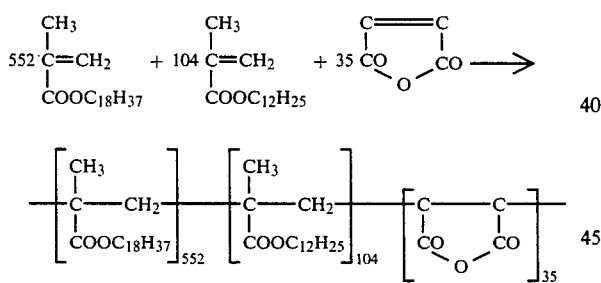

Analysis of the product indicates a molecular weight $\overline{M}_n$ of 20,000–200,000, preferably 40,000–100,000, say about 80,000. Infrared analysis show carbonyl stretching frequencies of 1730 cm$^{-1}$ (ester) and 1790 cm$^{-1}$ (anhydride).

Functionalization of the so-prepared polymer may be effected on the product so prepared without further work-up. Functionalization of the polymer is carried out by reaction with (i) a Mannich base formed by reacting a phenol containing an active hydrogen, an aldehyde, and a primary or secondary polyamine and (ii) a primary or secondary mono-amine.

THE FUNCTIONALIZING MANNICH BASE

The polyamine compositions which may be employed in practice of the process of this invention to prepare the Mannich base according to certain of its aspects may include primary or secondary poly amines. The poly amines may typically be characterized by the formula

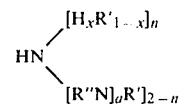

In this formula, a may be a number 1–20, preferably 1–10, say 5; x is 0 or 1; and n may be 0 or 1.

In the above compound, R' may be hydrogen or a hydrocarbon group selected from the group consisting of alkyl, aralkyl, cycloalkyl, aryl, and alkaryl, including such radicals when inertly substituted. When R' is alkyl, it may typically be methyl, ethyl, n-propyl, iso-propyl, n-butyl, i-butyl, sec-butyl, amyl, octyl, decyl, octadecyl, etc. When R' is a aralkyl, it may typically be benzyl, beta-phenylethyl, etc. When R' is cycloalkyl, it may typically be cyclohexyl, cycloheptyl, cyclooctyl, 2-methylcycloheptyl, 3-butylcyclohexyl, 3-methylcyclohexyl, etc. When R' is aryl, it may typically be phenyl, naphthyl, etc. When R' is alkaryl, it may typically be tolyl, xylyl, etc. R' may be inertly substituted i.e. it may bear a non-reactive substituent such as alkyl, aryl, cycloalkyl, ether, etc. Typically inertly substituted R' groups may include 2-ethoxyethyl, carboethoxymethyl, 4-methyl cyclohexyl, etc. The preferred R' groups may be hydrogen or lower alkyl, i.e. $C_1$–$C_{10}$ alkyl, groups including eg methyl, ethyl, n-propyl, i-propyl, butyls, amyls, hexyls, octyls, decyls, etc. R' may preferably be hydrogen.

R" may be a hydrocarbon selected from the same group as R' subject to the proviso that R" is divalent and contains one less hydrogen atom. R" may be alkylene, alkarylene, aralkylene, cycloalkylene, or arylene. In an alternative embodiment, R" may together with the nitrogen atoms may form a cycloaliphic or an aromatic ring typified by piperazine

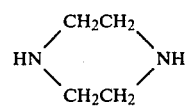

Typical polyamines which may be employed may include the following:

TABLE propylenediamine
diethylenetriamine
di-isopropylenetriamine
triethylenetetramine
tetraethylenepentamine
pentaethylenehexamine
piperazine
N—aminomethyl piperazine
N—(beta-aminoethyl) piperazine
N—hydroxy piperazine In one embodiment, R' may be hydrogen and R" —CH$_2$CH$_2$—. It is preferred however that the amine be a piperazine, preferably, N-(beta-aminoethyl)piperazine.

The charge aldehyde which may be employed may include those preferably characterized by the formula R$^5$CHO.

In the above compound, R$^5$ may be hydrogen or a hydrocarbon group selected from the group consisting of alkyl, aralkyl, cycloalkyl, aryl, alkaryl, including such radicals when inertly substituted. When R$^5$ is alkyl, it may typically be methyl, ethyl, n-propyl, iso-propyl, n-butyl, i-butyl, sec-butyl, amyl, octyl, decyl, octadecyl, etc. When $R^5$ is aralkyl, it may typically be benzyl, beta-phenylethyl, etc. When $R^5$ is cycloalkyl, it may typically be cyclohexyl, cycloheptyl, cyclooctyl, 2-methylcycloheptyl, 3-butylcyclohexyl, 3-methylcyclohexyl, etc. When $R^5$ is aryl, it may typically be phenyl, naphthyl, etc. When $R^5$ is alkaryl, it may typically be tolyl, xylyl, etc. $R^5$ may be inertly substituted i.e. it may bear a non-reactive substituent such as alkyl, aryl, cycloalkyl, ether, etc. Typically inertly inertly substituted $R^5$ groups may include 2-ethoxyethyl, carboethoxymethyl, 4-methyl cyclohexyl, etc. The preferred $R^5$ groups may be lower alkyl, i.e. $C_1$–$C_{10}$ alkyl, groups including eg methyl, ethyl, n-propyl, i-propyl, butyls, amyls, hexyls, octyls, decyls, etc. $R^5$ may preferably be hydrogen.

Typical aldehydes which may be employed may include the following:

TABLE
---
formaldehyde
ethanal
propanal
butanal etc.

The preferred aldehyde may be formaldehyde employed as its polymer paraformaldehyde.

The charge phenols which may be employed in practice of the process of this invention may preferably be characterized by the formula $HR^6OH$. It is a feature of these phenols that they contain an active hydrogen which will be the site for substitution. Polyphenols (eg compounds containing more than one hydroxy group in the molecule whether on the same ring or not) may be employed. The rings on which the hydroxy groups are sited may bear inert substituents. However at least one position which may be meta-, but which is preferably ortho- or para- to a phenol hydroxy group, must be occupied by an active hydrogen as this is the point of reaction with the aldehyde group.

$R^6$ may be an arylene hydrocarbon group typified by —$C_6H_4$—, —$C_6H_3(CH_3)$—, —$C_6H_3(C_2H_5)$—, etc.

Typical phenols which may be employed may include:

TABLE
---
phenol
o-cresol
m-cresol
p-cresol
o-methoxyphenol
m-methoxyphenol
p-methoxyphenol
o-phenylphenol
m-phenylphenol
p-phenylphenol
beta-naphthal
resorcinol
hydroquinone It is a particular feature of this invention, in its preferred embodiments, that the Mannich base bre prepared from a hindered phenol i.e. a phenol which bears in the 2- and 6-positions bulky groups typified t-butyl or t-amyl. Presence of such groups contributes anti-oxidant ability to the resultant product. Typical hindered phenols may include:

TABLE
---
2,6-di-t-butyl phenol
bis-4,4-(2,6-di-t-butyl phenol) methane

TABLE-continued
---
2,6-di-t-propyl, phenol

The preferred phenol may be 2,6-di-t-butyl phenol.

Reaction to form the phenol-amine-aldehyde Mannich condensate may be effected by adding 0.1–1.3 moles, say 0.2–1.5 moles of aldehyde and 0.1–1.3 moles, say 1 mole of amine nd 0.1–1.3 moles, say 1 mole of phenol. In one preferred embodiment, one mole of formaldehyde (as paraformaldehyde) may react with one mole of 2,6-di-t-butyl phenol and 1 mole of N-aminoethyl piperazine.

Reaction is preferably effected by adding the reactants (preferably the aldehyde is added last) to a reaction operation under a blanket of inert gas, typically nitrogen. The reaction mixture is maintained at 80° C.–160° C., say about 100° C. for 0.5–5 hours, say 2 hours.

Typically reaction may be as follows:

$$R'(NR'')_aNH_2 + \begin{array}{c}R^5\\C=O\\H\end{array} + HR^6OH \longrightarrow$$

$$R'(NH'')_aNHCR^6OH + H_2O$$
with $R^5$ above and $H$ below the central C.

In a specific embodiment, the reaction may be as follows:

$$H_2NC_2H_4NH_2 + CH_2O + HC_6H_4OH \longrightarrow$$

$$H_2NC_2H_4NHCH_2C_6H_4OH + H_2O$$

Illustrative phenol-amine-aldehyde Mannich base condensates which may be so formed include the following:

TABLE

A. 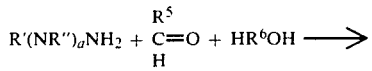

B. 

C.

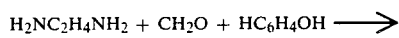

D. 
$$\begin{array}{c}CH_2\\|\\H_2NC_3H_6NC_2H_4NC_3H_6NH_2\end{array}$$

E.

HO—⟨ring⟩—CH₂—N⟨piperazine⟩NCH₂CH₂OH

THE FUNCTIONALIZING AMINE

The amine which may be employed to functionalize the polymer may be characterized by the formula $$R_2^7(NR^9)_a NR^8_2$$

In the above compound, $R^7$ may be a hydrocarbon group selected from the group consisting of alkyl, aralkyl, cycloalkyl, aryl, and alkaryl including such radicals when inertly substituted. When $R^7$ is alkyl, it may typically be methyl, ethyl, n-propyl, iso-propyl, n-butyl, sec-butyl, amyl, octyl, decyl, octadecyl, etc. When $R^7$ is aralkyl, it may typically be benzyl, beta-phenylethyl, etc. When $R^7$ is cycloalkyl, it may typically be cyclohexyl, cycloheptyl, cyclooctyl, 2-methylcycloheptyl, 3-butylcyclohexyl, 3-methylcyclohexyl, etc. When $R^7$ is aryl, it may typically be phenyl, naphthyl, etc. When $R^7$ is alkaryl, it may typically be tolyl, xylyl, etc. $R^7$ may be inertly substituted i.e. it may bear a non-reactive substituent such as alkyl, aryl, cycloalkyl, ether, etc. Typically inertly substituted $R^7$ groups may include 2-ethoxyethyl, carboethoxymethyl, 4-methyl cyclohexyl, etc. The preferred $R^7$ groups may be hydrogen or lower alkyl, i.e. $C_1$–$C_{10}$ alkyl, groups including eg methyl, ethyl, n-propyl, i-propyl, butyls, amyls, hexyls, octyls, decyls, etc. $R^7$ may preferably be methyl or hydrogen.

$R^8$ may be hydrogen or selected from the same groups as that form which $R^7$ is selected. $R^8$ is preferably methyl.

In the above formula, $R^9$ may be a hydrocarbon group selected from the group consisting of alkylene, aralkylene, cycloalkylene, arylene and alkarylene including such radicals when inertly substituted. When $R^9$ is alkylene, it may typically be methylene, ethylene, n-propylene, iso-propylene, n-butylene, i-butylene, sec-butylene, amylene, octylene, decylene, octadecylene, etc. When $R^9$ is aralkylene, it may typically be benzylene, beta-phenylethylene, etc. When $R^9$ is cycloalkylene, it may typically be cyclohexylene, cycloheptylene, cyclooctylene, 2-methylcycloheptylene, 3-butylcyclohexylene, 3-methylcyclohexylene, etc. When $R^9$ is arylene, it may typically be phenylene, naphthylene, etc. When $R^9$ is alkarylene, it may typically be tolylene, xylylene, etc. $R^9$ may be inertly substituted i.e. it may bear a non-reactive subsitutent such as alkyl, aryl, cycloalkyl, ether, etc. Typically inertly substituted $R^9$ groups may include 3-methoxypropylene, 2-ethoxyethylene, carboethoxymethylene, 4-methylcyclohexylene, etc. The preferred $R^9$ groups may be lower alkylene, i.e. $C_1$'$C_{10}$ alkylene, groups including eg methylene, ethylene, n-propylene, i-propylene, butylene, amylene, hexylene, octylene, decylene, etc. $R^9$ may preferably be ethylene —$CH_2CH_2$—.

a may be 0–20, preferably 0–6, say 1.

Typical of the amines which may be employed may be the following:

TABLE n-propyl amine
ethylenediamine
diethylenetriamine
triethylenetetramine
tetraethylenepentamine
3-(N,N—dimethylamino)propylamine
dimethylaminopropylamine Preferred of the above amines is dimethylaminopropylamine i.e. 3-(N,N-dimethylamino)propylamine.

FUNCTIONALIZATION

Derivatization or functionalization of the polymer may be carried out under functionalizing conditions in liquid phase preferably by adding to the polymer (typically in inert diluent-solvent as recovered from polymerization) (i) the functionalizing amine and (ii) the functionalizing Mannich base. The amine may be added to the polymer in amount of 0.1–1.5 moles, say 0.5 moles per mole of dicarboxylic acid moieties in the polymer. The Mannich base may be added to the polymer in amount of 0.25–2 moles, say 1.5 moles per mole of dicarboxylic acid moieties in the polymer. Preferably the mole ratio of functionalizing amine to Mannich base added to the polymer may be 0.1:1–3:1, say 0.33:1.

The reaction mixture, preferably under inert (eg nitrogen) atmosphere is heated to 80° C.–200° C., say about 160° C. for 1–4 hours, say about 1 hour preferably at atmospheric pressure. Thereafter the temperature is raised to 150° C.–200° C., say about 180° C. for 1'8 hours, say about 3 hours. At the end of this time, the reaction mixture is cooled.

During the reaction, the functionalizing amine and the Mannich base become bonded to the dicarboxylic acid-derived moieties in the polymer to form products which may typically include those having the following structures in the maleic acid anhydride derived moiety.

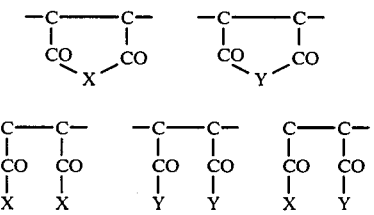

For simplicity, these structures may be summarized in the single structure:

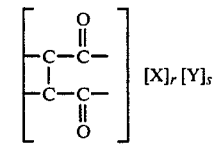

wherein r and s may equal 0, 1, or 2, at least one of r or s being at least 1, and r+s being 1 or 2.

It will be apparent that the single structural formula includes closed ring formulae when r is 1 and s is 0 or when r is 0 and s is 1. When (i) r is 1 and s is 1 or (ii) r is 2 or (iii) s is 2, the formulae include open ring.

In these formulae, X represents a moiety derived from the functionalizing amine bonded to the molecule through the nitrogen of an amine group and Y represents a moiety derived from the Mannich base condensate bonded to the molecule through a nitrogen of an amine group.

The functionalized polymer may contain, per 1000 carbon atoms in the backbone, amine in amount of 0.002–0.1 moles, preferably 0.0025–0.25, sat 0.02 moles and Mannich base in amount of 0.005–0.3 moles, preferably 0.0075–0.075, say 0.05 moles.

Analysis of the product so prepared shows loss of anhydride carbonyl stretch at 1790 cm$^{-1}$; ester carbonyl stretching at 1730 cm$^{-1}$ is retained.

The product so prepared is typically a solution containing 25-80 w%, say 50 w% of functionalized copolymer in inert diluent-solvent. In preferred operation, it may be employed as so prepared with no further work up. For convenience of handling if desired it may be diluted to a concentration of 10-50 w%, say 20 w% by addition of additional diluent-solvent which may be the same as that employed in the reaction—or it may be a lubricating oil cut such as that in which the product may be formulated.

LUBRICATING COMPOSITION

It is a feature of this invention that the polymer product so prepared may be added in minor effective portion to a major portion of a lubricating oil; and the lubricating compositions so prepared may be found to possess superior properties:

The lubricating oils which may be treated by the process of this invention may include oils intended for use in automotive, railroad, marine, aircraft, etc; spark ignition or compression ignition; winter or summer; heavy duty or light duty; etc. The oil may be a hydrocarbon, ester, or silicone, etc. composition.

A typical lubricating oil in which the polymer of this invention may be present, may be a standard SAE 5W-30 hydrocarbon motor oil having the following components:

TABLE

| | | W % |
|---|---|---|
| Solvent Neutral Oil 100 sus | | 80 |
| Kin. Visc. | | |
| 40° C. (cSt) | 20 | |
| 100° C. (cSt) | 4.0 | |
| Pour Point (°F.) | 0 to +10 | |
| Viscosity Index Improver | | 11 |
| (ethylene-propylene copolymer) | | |
| Standard Additive Package | | 9 |
| Polyisobutyenyl (M$_n$ 1290) succinimide | | |
| (dispersant and anti-wear) | | |
| calcium sulfonate (detergent) | | |
| Zinc dithiophosphate (anti-wear) | | |
| di-nonyl diphenyl amine (anti-oxidant) | | |
| 4,4'-methylene-bis (2,6-di-t-butyl phenol) | | |
| (anti-oxidant) | | |
| polyethoxy phenol (anti-wear) | | |

It is a feature of this invention that the novel polymer may serve as a multifunctional lube oil additive. Generally the additive may be present in amounts ranging from as little as 0.005 w% up to as much as say 10%. Smaller quantities will only give desired improvement to a lesser degree; and larger quantities may not generally be recommended.

When it is to be used as a sole dispersant, it may be present in effective amount of 2-10 w%, say about 5 w%. When it is to be used as sole viscosity index improver, it may be present in effective amount of 2-10 w%, say about 5 w%. When it is to be used as a pour point depressant, it may be present in amount of 0.005-2 w%, say about 0.5 w%.

When it is intended that the additive polymer serve to provide all of these functions, as a supplement to a standard system, the effective amount may be 0.005-5 w%, say about 0.7 w% based on total lubricating composition. When employed in his manner, it may be used to upgrade prior art viscosity index improver dispersant system.

The ability of this polymer to serve as a dispersant additive may be measured by the Bench VC Test (BVCT), in which the turbidity of an oil is measured after addition of synthetic blow-by.

When compared to the standards (Excellent, Good, Fair) of the Bench VC Test, lubricating oils, containing the additives of this invention consistently show high performance characteristics to a degree surpassing control formulations. The formulations of this invention consistently show improved performance when compared to e.g. underivatized maleic anhydride-methacrylate terpolymer.

The ability of this polymer to serve as a viscosity index improver may be measured by ASTM Test D-445.

It is found that lubricating compositions containing the product of this invention are characterized by satisfactory (i.e. lowered) Pour Point when tested by ASTM Test D 97-79.

More importantly, these formulations, when tested by the Ford Max Pour Point Test (as set forth at Ford Motor Co. Quality Laboratory and Chemical Engineering Physical Test Methods Required by Ford Engineering Specification ESEM 2C 35-F to 39-F), show an unexpected ability to maintain (or even to improve) the pour point during the course of this extended test to a degree not observed with prior art formulations.

It is found that the Borderline Pumping Temperature (BPT) °C., when determined by ASTM D-3829, is equal to or better than comparable prior art lubricating oil compositions.

DESCRIPTION OF SPECIFIC EMBODIMENTS

Practice of the process of this invention will be apparent to those skilled in the art from the following wherein, as elsewhere in this specification, all parts are parts by weight unless otherwise noted.

EXAMPLE I

| Component | Grams | Moles |
|---|---|---|
| Maleic acid anhydride | 4.95 | 0.51 |
| Lauryl methacrylate | 204.05 | 0.739 |
| Alfol 1620 brand of stearyl methacrylate | 43.75 | 0.134 |
| Lauryl mercaptan (chain transfer agent) | 0.25 | 0.124 |
| 145 P Pale Turbine Stock HF (solvent) | 43.55 | — |
| Azobisisobutyronitrile (AIBN) First | 0.40 | 0.0014 |
| Second | +0.09 | 0.0003 |
| 100 Pale Oil | 199.3 | |

The first five components are added to a reaction vessel which is then blanketed with nitrogen and heated to 83° C. The sixth component (0.40 grams) is added and heating is continued until two consecutive identical refractive indices were obtained (3.5 hours). There are then added 0.09 g of azobisisobutyronitrile and 199.30 g of 100 E Pale Oil. The temperature is raised to 100° C. and maintained for one hour; the reaction mixture is cooled to room temperature.

Analysis of the terpolymer product shows $\overline{M}_n$ of 81,000 and $\overline{M}_w$ of 183,000. Infrared analysis shows carbonyl stretching frequency of 1730 cm$^{-1}$ and 1790 cm$^{-1}$ which are characteristic respectively of the ester and the anhydride.

This corresponds to a product polymer

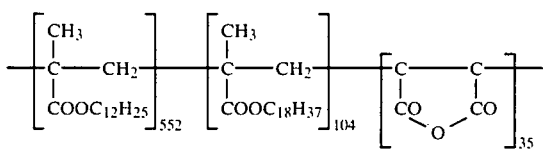

EXAMPLE II

In this example, preparation of the functionalizing Mannich base is carried out by adding (under nitrogen) 206 g (1 mole) of 2,6-di-t-butylphenol and 205 g (1.6 mol) of N-(beta aminoethyl)piperazine to a reaction vessel. While maintaining the temperature at 25° C.–30° C., there is slowly added 45 g (1.5 mol) of formaldehyde (as paraformaldehyde). After addition is complete the temperature is raised to reflux temperature (110° C.) for 2 hours. The reaction mixture is then filtered to remove unreacted paraformaldehyde. Unreacted phenol and piperazine are removed by vacuum distillation. The product is analysed by Gas Chromatography-Mass Spectroscopy (GC-MS) and Nuclear Magnetic Resonance (NMR).

EXAMPLE III

In this example, derivatization of the polymer is carried out. The polymer product (500 g containing 50% oil) of Example I is added to the reaction vessel. After purging with nitrogen, there is added the Mannich base condensate (26.48 g 0.0763 mole) of Example II and 3-(N,N-dimethylamino)propylamine (2.60 ml, 0.0255 mole). The temperature is raised to 160° C. for 1 hour and then raised to 180° C. for an additional 3 hours. A total of 0.3 ml of liquid distillate is collected. Analysis of the polymer remaining showed no anhydride carbonyl stretch at 1790⁻cm. The ester carbonyl at 1730/cm is visible.

EXAMPLE IV

In this example, the procedure of Example III is duplicated, except that the functionalizing amine is undecyl amine (3.95 g, 0.0255 mole).

EXAMPLE V

In this example, the procedure of Example III is duplicated except that the functionalizing amine is dodecyl amine (12.90 g, 0.0763 mole) and 0.0255 moles of the Mannich base are present.

EXAMPLE VI*

In this control example, the procedure of Example III is duplicated except that no functionalizing amine is reacted—merely the polymer-in-oil (500 g) and the Mannich base (in amount of 35.3 g, 0.1018 moles).

The products of Example III–VI are subjected to the Bench VC Test (BVCT). In this test, the ability of an additive to serve as a dispersant is determined by measuring the turbidity of an oil after addition of synthetic blow-by. The oil is rated against three standards: one of which is characterized by excellent dispersancy, and another by fair dispersancy, and another by good dispersancy. Rating is on a scale of 0.100. Low ratings at or below that received by the oil of good dispersancy are indicative that the additive is a candidate for use as a dispersancy additive.

In this test, each additive is added (4.85 w%) to a low cost SE lubricating oil base blend having the following composition:

TABLE

| Component | W % |
|---|---|
| SNO-7 oil | 75.25 |
| SNO-20 oil | 21.74 |
| Zinc dithiophosphate (anti-wear) | 1.12 |
| Naugalube 438 brand of di-nonyl-di-phenyl amine (antioxidant) | 0.39 |
| Surchem 521 brand of magnesium sulfonate (detergent) | 1.50 |
| Silicone polymer (anti-foamant) | 150 ppm |

This base blend has the following properties:

TABLE

| Property | Value |
|---|---|
| Kinematic Viscosity | |
| cSt 40° C. | 31.50 |
| 100° C. | 5.36 |
| Pour Point °F. | +5 |
| Ash (Sulfated) % (by ASTM D-874) | 0.93 |
| Phosphorus % X-ray | 0.11 |
| Sulfur % X-ray total | 0.40 |
| Zinc % X-ray | 0.12 |
| Magnesium % | 0.33 |
| Cold Cranking Simulator cP @ −18° C. | 1660 |

TABLE

| Example | BVCT Rating | Standards |
|---|---|---|
| III | 19.4 | 17/33/43 |
| IV | 27.5 | 17/34/44 |
| V | 69.0 | 17/33/43 |
| VI* | Void-Cross-linked | 19/14/56 |

From the above Table, the following conclusions may be noted:

(i) From control Example VI*, it is apparent that under the noted conditions the use of Mannich base alone gave a cross-linked polymer which could not be tested by the BVCT;

(ii) Use (Example V) of monfunctional amine prevented cross-linking and yielded a derivatized polymer which is useful as a dispersant additive;

(iii) Increasing the ratio of Mannich base to monfunctional amine improved the dispersancy of the derivative polymer (Example IV);

(iv) Use of polyfunctional amine in place of monofunctional amine yielded improved dispersancy (Example III).

Although this invention has been illustrated by reference to specific embodiments, it will be apparent to those skilled in the art that various changes and modifications may be made which clearly fall within the scope of the invention.

We claim:

1. A functionalized polymer capable of use as an additive in lubricating oils comprising
   (a) first units, derived from first monomer containing an ethylenically unsaturated carbon-to-carbon double bond; and (b) second units, derived from a different second monomer, a dicarboxylic acid anhydride containing an ethylenically unsaturated carbon-to-carbon double bond; and (c) said polymer bearing, bonded to the dicarboxylic-acid-derived moiety, functionalizing groups derived from:

(i) a primary or secondary functionalizing amine $R^7{}_2(NR^9)_aNR^8{}_2$ where $R^7$ is alkyl, alkaryl, aralkyl, cycloalkyl, or aryl hydrocarbon, $R^8$ is hydrogen or selected from the same group as in $R^7$, $R^9$ is alkylene, aralkylene, cycloalkylene, alkarylene, or arylene, and a is 0.20, said amine being, bonded to said polymer through a nitrogen atom of the amine group; and, (ii) a functionalizing Mannich base formed by reacting a phenol containing an active hydrogen atom, an aldehyde and a primary or secondary polyamine, said Mannich base bonded to said polymer through a nitrogen atom of the amine group.

2. A functionalized polymer as claimed in claim 1 wherein said first units are derived from an acrylate ester or a methacrylate ester first monomer.

3. A functionalized polymer as claimed in claim 1 wherein said first units are derived from an acrylate ester or a methacrylate ester first monomer which contains 10-16 carbon atoms in the alcohol-derived moiety of said ester.

4. A functionalized polymer as claimed in claim 1 wherein said first units in said polymer are derived from lauryl methacrylate first monomer.

5. A functionalized polymer as claimed in claim 1 wherein said polymer contains first units derived from an acrylate ester or a methacrylate ester first monomer and supplemental first units derived from, as supplemental first monomer, an acrylate ester or a methacrylate ester, containing at least one more carbon atom in the alcohol-derived moiety of said ester than is contained in the alcohol-derived moiety of said first monomer.

6. A functionalized polymer as claimed in claim 5 wherein said supplemental first monomer contains 12-18 carbon atoms in the alcohol-derived moiety of said ester.

7. A functionalized polymer as claimed in claim 5 wherein said supplemental first monomer is stearyl methacrylate.

8. A funcationalized polymer as claimed in claim 1 wherein said second units are derived from maleic acid anhydride.

9. A functionalized polymer as claimed in claim 1 wherein said polyamine is

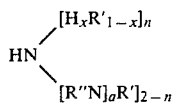

wherein
R' is hydrogen or an alkyl, alkaryl, arakyl, cycloalkyl, or aryl hydrocarbon group;
R" is an alkylene, alkarylene, aralkylene, cycloalkylene, or arylene hydrocarbon group;
n is 0 or 1;
a is 1-20; and
x is 0 or 1.

10. A functionalized polymer as claimed in claim 1 wherein said polyamine is a piperazine.

11. A functionalized polymer as claimed in claim 1 wherein said polyamine is N-(beta-aminoethyl)piperazine.

12. A functionalized polymer as claimed in claim 1 wherein said aldehyde is $R^5CHO$ wherein $R^5$ is hydrogen or an alkyl, alkaryl, aralkyl, cycloalkyl, or aryl hydrocarbon group.

13. A functionalized polymer as claimed in claim 1 wherein said phenol is $HR^6OH$ wherein $R^6$ is an arylene hydrocarbon group.

14. A functionalized polymer capable of use as an additive in lubricating oils containing (i) first units derived from lauryl methacrylate first monomer and (ii) second units derived from maleic acid anhydride second monomer and (iii) bearing, bonded to the maleic-acid-anhydride-derived moiety, functionalizing groups derived from a piperazine as a functionalizing amine, bonded to said polymer through a nitrogen atom of the amine group; and (iv) as a functionalizing Mannich base, the Mannich base derived from formaldehyde, N-(beta-aminoethyl)piperazine, and 2,6-di-t-butyl phenol, said Mannich base bonded to said polymer through a nitrogen atom of the amine group.

15. A functionalized polymer as claimed in claim 14 also including units derived from as supplemental first monomer stearyl methacrylate.

16. A functionalized copolymer capable of use as an additive in lubricating oils comprising (i) acrylic ester units derived from first monomer having the formula $$\begin{array}{c} R^1 \\ | \\ C{=}CH_2 \\ | \\ COOR^2 \end{array}$$

wherein $R^2$ is a hydrocarbon group selected from the group consisting of alkyl aralkyl alkaryl cycloalkyl and aryl hydrocarbon groups and $R^1$ is hydrogen or selected from the same group as $R^2$; and (ii) dicarboxylic units derived from second monomer having the formula $$\begin{array}{ccccc} R^3 & R^4 & R^3 & R^4 & R^3 & R^4 \\ | & | & | & | & | & | \\ -C-\!-\!-C-; & \text{or} & -C-\!-\!-\!-C- & \text{and} & -C-\!-\!-\!-C- \\ | & | & | & | & | & | \\ CO & CO & CO\diagdown\:\:CO & & CO\diagdown\:\:CO \\ X & Y & X & & Y \end{array}$$

wherein $R^3$, $R^4$, $R^6$, and $R^7$ are hydrogen or selected from the same group as $R^2$;

X is derived from a functionalizing primary amine $R^7{}_2(NR^9)_aNR^8{}_2$ wherein $R^7$ is alkyl, alkaryl, aralkyl, cycloalkyl, or aryl hydrocarbon, $R^8$ is hydrogen or selected from the same group as is $R^7$, $R^9$ is alkylene, aralkylene, cycloalkylene, alkarylene, or arylene, and a is 0-20; and Y is derived from a functionalizing Mannich base, both X and Y being bonded to the dicarboxylic units through a nitrogen atom.

17. A concentrate containing (1) a diluent-solvent; and (2) a functionalized polymer capable of use as an additive in lubricating oils comprising
   (a) first units, derived from first monomer containing an ethylenically unsaturated carbon-to-carbon double bond; and
   (b) second units, derived from a different second monomer, a dicarboxylic acid anhydride containing an ethylenically unsaturated carbon-to-carbon double bond; and
   (c) said polymer bearing, bonded to the dicarboxylic-acid-derived moiety, functionalizing groups derived from:
      (i) a primary or secondary functionalizing amine $R^7{}_2(NR^9)_aNR^8{}_2$ wherein $R^7$ is alkyl, alkaryl, aralkyl, cycloalkyl, or aryl hydrocarbon, $R^8$ is hydrogen or selected from the same group as is $R^7$, $R^9$ is alkylene, aralkylene, cycloalkylene, alkarylene, or arylene, and a is 0.20, said amine being, bonded to said polymer through a nitrogen atom of the amine group; and
      (ii) a functionalizing Mannich base formed by reacting a phenol containing an active hydrogen atom, an aldehyde, and a primary or secondary polyamine, said Mannich base bonded to said polymer through a nitrogen atom of the amine group.

18. A lubricating composition comprising
(1) a major portion of a lubricating oil; and
(2) a minor effective portion of a functionalized polymer capable of use as an additive in lubricating oils comprising
   (a) first units, derived from first monomer containing an ethylenically unsaturated carbon-to-carbon double bond; and
   (b) second units, derived from a different second monomer, a dicarboxylic acid anhydride containing an ethylenically unsaturated carbon-to-carbon double bond; and
   (c) said polymer bearing, bonded to the dicarboxylic-acid-derived moiety, functionalizing groups derived from:
      (i) a primary or secondary functionalizing amine $R^7{}_2(NR^9)_aNR^8{}_2$ wherein $R^7$ is alkyl, alkaryl, aralkyl, cycloalkyl, or aryl hydrocarbon, $R^8$ is hydrogen or selected from the same group as is $R^7$, $R^9$ is alkylene, aralkylene, cycloalkylene, alkarylene, or arylene, and a is 0.20, said amine being, bonded to said polymer through a nitrogen atom of the amine group; and
      (ii) a functionalizing Mannich base formed by reacting a phenol containing an active hydrogen atom, an aldehyde, and a primary or secondary polyamine, said Mannich base bonded to said polymer through a nitrogen atom of the amine group.

19. A lubricating composition as claimed in claim 18 wherein said lubricating oil is a hydrocarbon lubricating oil.

20. A lubricating composition as claimed in claim 18 wherein said first units are derived from an acrylate ester or a methacrylate ester first monomer.

21. A lubricating composition as claimed in claim 18 wherein said first units are derived from an acrylate ester or a methacrylate ester first monomer which contains 10–16 carbon atoms in the alcohol-derived moiety of said ester.

22. A lubricating composition as claimed in claim 18 wherein said first units are derived from lauryl methacrylate first monomer.

23. A lubricating composition as claimed in claim 18 wherein said polymer contains first units derived from an acrylate ester or a methacrylate ester first monomer and supplemental first units derived from, as supplemental first monomer, an acrylate ester or a methacrylate ester and containing at least one more carbon atom in the alcohol-derived moiety of said ester than is contained in the alcohol-derived moiety of said first monomer.

24. A lubricating composition as claimed in claim 18 wherein said supplemental first monomer contains 12–18 carbon atoms in the alcohol-derived moiety of said ester.

25. A lubricating composition as claimed in claim 18 wherein said supplemental first monomer contains 12–18 carbon atoms in the alcohol-derived moiety of said ester.

26. A lubricating composition as claimed in claim 18 wherein said supplemental first monomer is stearyl methacrylate.

27. A lubricating composition as claimed in claim 18 wherein said second units are derived from maleic acid anhydride.

28. A lubricating composition as claimed in claim 18 wherein said polyamine is

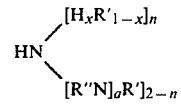

wherein
R' is hydrogen or an alkyl, alkaryl, arakyl, cycloalkyl, or aryl hydrocarbon group;
R" is an alkylene, alkarylene, aralkylene, cycloalkylene, or arylene hydrocarbon group;
n is 0 or 1;
a is 1–20; and
x is 0 or 1.

29. A lubricting composition as claimed in claim 18 wherein said polyamine is a piperazine.

30. A lubricating composition as claimed in claim 18 wherein said polyamine is N-(beta-aminoethyl)piperazine.

31. A hydrocarbon lubricating composition comprising
   (a) a major portion of a hydrocarbon lubricating oil; and
   (b) a minor effective portion of a functionalized polymer capable of use as an additive in lubricating oils containing first units derived from lauryl methacrylate first monomer and maleic acid anhydride second monomer and bearing functionalizing groups derived from a piperazine as a functionalizing amine, bonded to said polymer through a nitrogen atom of the amine group; and as a functionalizing Mannich base, the Mannich base derived from formaldehyde, N-(beta-aminoethyl)piperazine, and 2,6-di-t-butyl phenol, said Mannich base bonded to said polymer through a nitrogen atom of the amine group.

32. A hydrocarbon lubricating compositions as claimed in claim 31 also including units derived from, as supplemental first monomer, stearyl methacrylate.

33. A hydrocarbon lubricating composition as claimed in claim 31 wherein said minor effective portion is 0.005–10 w%.

34. A hydrocarbon lubricating composition as claimed in claim 31 wherein said minor effective portion is 2–10 w%.

35. A hydrocarbon lubricating composition as claimed in claim 31 wherein said minor effective portion is 0.005–5 w%.

36. A hydrocarbon lubricating composition as claimed in claim 31 wherein said minor effective amount is 0.005–2 w%.

37. The method which comprises adding to a lubricating oil a minor effective portion of a functionalized polymer capable of use as an additive in lubricating oils containing first units derived from lauryl methacrylate first monomer and second units derived from maleic acid anhydride second monomer and bearing functionalizing group derived from a piperazine and as functionalizing amine, bonded to said polymer through a nitrogen atom of the amine group and, as a funtionalizing Mannich base the Mannich base, derived from formaldehyde, N-(beta-aminoethyl)piperazine, and 2,6-di-t-butyl phenol, said Mannich base bonded to said polymer thrugh a nitrogen atom of the amine group.

* * * * *

UNITED STATES PATENT AND TRADEMARK OFFICE
CERTIFICATE OF CORRECTION

PATENT NO.  : 4,668,412
DATED       : May 26, 1987
INVENTOR(S) : William P. Hart and Christopher S. Liu It is certified that error appears in the above-identified patent and that said Letters Patent is hereby corrected as shown below:

Column 15, line 13 and column 17, lines 19 and 49 correct "0.20" to read -- 1-20 --;

Column 16, line 63, correct "0-20" to read -- 1-20 -- thereby conforming to column 6, line 7;

Column 15, line 50, correct the spelling of "functionalized".

Signed and Sealed this

Twentieth Day of October, 1987

Attest:

DONALD J. QUIGG

*Attesting Officer*         *Commissioner of Patents and Trademarks*